US009032002B2

(12) United States Patent  (10) Patent No.: US 9,032,002 B2
Hanson et al.  (45) Date of Patent: May 12, 2015

(54) SINGLE FILE SERIALIZATION FOR PHYSICAL AND LOGICAL META-MODEL INFORMATION

(75) Inventors: Stephen Michael Hanson, Romsey (GB); Suman Kumar Kalia, Maple (CA); Matthew Colin Lovett, Winchester (GB); Evangelos Mamas, Toronto (CA); David Adiel Spriet, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1956 days.

(21) Appl. No.: 10/835,329

(22) Filed: Apr. 29, 2004

(65) Prior Publication Data

US 2005/0091249 A1   Apr. 28, 2005

(30) Foreign Application Priority Data

Oct. 22, 2003   (CA) ...................................... 2446082

(51) Int. Cl.
*G06F 17/30*   (2006.01)
*G06F 17/22*   (2006.01)
(52) U.S. Cl.
CPC .................................. *G06F 17/2247* (2013.01)
(58) Field of Classification Search
CPC ................................................. G06F 17/30292
USPC .................. 707/101, 102, 809; 717/136, 137
See application file for complete search history.

(56) References Cited

U.S. PATENT DOCUMENTS

| 5,970,490 | A | | 10/1999 | Morgenstern | 707/10 |
|---|---|---|---|---|---|
| 5,995,969 | A | * | 11/1999 | Lee et al. | 707/3 |
| 6,199,195 | B1 | | 3/2001 | Goodwin et al. | 717/108 |
| 6,208,345 | B1 | | 3/2001 | Sheard et al. | 709/203 |
| 6,401,092 | B1 | | 6/2002 | Donohoe et al. | 707/10 |
| 6,898,604 | B1 | * | 5/2005 | Ballinger et al. | 707/101 |
| 7,131,116 | B1 | * | 10/2006 | Krishna | 717/136 |
| 7,225,411 | B1 | * | 5/2007 | Stoner et al. | 715/760 |
| 7,373,596 | B2 | * | 5/2008 | Hu et al. | 715/239 |
| 2002/0053070 | A1 | * | 5/2002 | Seki | 717/107 |
| 2002/0059566 | A1 | | 5/2002 | Delcambre et al. | 717/146 |
| 2002/0184264 | A1 | * | 12/2002 | Berg et al. | 707/513 |

(Continued)

FOREIGN PATENT DOCUMENTS

CA          2329559         6/2002

OTHER PUBLICATIONS

J. Newkirk et al., "How .Net's Custom Attributes Affect Design", IEEE Software, vol. 19, Issue t, Sep./Oct. 2002, p. 18-20.

(Continued)

*Primary Examiner* — Etienne Leroux
*Assistant Examiner* — Chelcie Daye
(74) *Attorney, Agent, or Firm* — DeLizio Gilliam, PLLC (57) ABSTRACT

A technique for serializing both logical and physical meta-model information in a single file is disclosed. In an embodiment, the logical meta-model information is serialized in an Extensible Marking Language (XML) schema compliant format, and the physical meta-model information is inserted into the logical meta-model in suitable locations such that the mappings between the logical and physical meta-models are preserved. In an embodiment, an XML "appInfo" annotation is used to carry physical meta-model information used by multiple applications and suitably placed in a nested configuration with its corresponding logical meta-model information.

19 Claims, 8 Drawing Sheets

Steps
1. Serialize logical meta-model in the .xsd file (in xml format)
2. Serialize physical meta-model including mappings between physical and logical meta-models in the .msd file (in xmi format)

(56) References Cited

U.S. PATENT DOCUMENTS

| | | | |
|---|---|---|---|
| 2003/0041311 A1 | 2/2003 | Poole et al. | 717/100 |
| 2003/0110177 A1* | 6/2003 | Andrei et al. | 707/100 |
| 2004/0015840 A1* | 1/2004 | Walker | 717/108 |
| 2004/0039964 A1* | 2/2004 | Russell et al. | 714/25 |
| 2004/0073870 A1* | 4/2004 | Fuh et al. | 715/513 |
| 2005/0071750 A1* | 3/2005 | Nelson | 715/503 |
| 2005/0071809 A1* | 3/2005 | Pulley | 717/108 |
| 2005/0080930 A1* | 4/2005 | Joseph | 709/248 |
| 2005/0154976 A1* | 7/2005 | Nelson | 715/513 |

OTHER PUBLICATIONS

Spreitzer et al., "More Flexible Data Types", IEEE Eighth International Workshops on Enabling Technologies on Infrastructure for Collaborative Enterprises, Jun. 1999, p. 319-324.

CA920020043CA1, Kalia, Suman, et al.; "Meta-Model for Associating Multiple Physical Representations of Logically Equivalent Entities in Messaging and Other Applications", Serial No. 2412383; Filed Nov. 2002.

* cited by examiner

FIG. 2B xsd file

```
301    <?xml version="1.0" encoding="UTF-8"?>
302    <xsd:schema xmlns:xsd="http://www.w3.org/2001/XMLSchema">
303      <xsd:complexType name="complexType1">
304        <xsd:sequence/>
305      </xsd:complexType>
306      <xsd:element name="message1" type="complexType1"/>
```

FIG. 3A ← 300 msd file

```
311    <?xml version="1.0" encoding="UTF-8"?>
312    <MSGModel:MRMsgCollection xmi:version="2.0" xmlns:xmi="http://www.omg.org/XMI"
       xmlns:MSGModel="MSGModel.xmi" xmlns:XSD="XSD.xmi" xmi:id="MRMsgCollection_1"
       name="new2.msd">
313      <XSDToMRMapper xmi:id="XSDToMRMapper_1">
314        <schemaObject xmi:type="XSD:XSDElementDeclaration" href="new/new2.xsd#/
       message1;XSDElementDeclaration/"/>
315        <mrObject xmi:type="MSGModel:MRGlobalElement" xmi:id="MRGlobalElement_1">
316          <MRElementRep xmi:type="MSGModel:MRXMLElementRep"
       xmi:id="MRXMLElementRep_1" xmlName="message1XML" messageSetDefaultRep="XML"/>
317          <MRElementRep xmi:type="MSGModel:MRTDSElementRep"
       xmi:id="MRTDSElementRep_1" tag="theTag" precision="-1" messageSetDefaultRep="TDS"/>
318        </mrObject>
319      </XSDToMRMapper>
320      <XSDToMRMapper xmi:id="XSDToMRMapper_2">
321        <schemaObject xmi:type="XSD:XSDComplexTypeDefinition" href="new/new2.xsd#/
       complexType1;XSDComplexTypeDefinition/"/>
322        <mrObject xmi:type="MSGModel:MRComplexType" xmi:id="MRComplexType_1"/>
323      </XSDToMRMapper>
```

FIG. 3B ← 310

```
331    <xsd:simpleType name="CHAR">
332      <xsd:annotation>
333        <xsd:appinfo>
334          <db2xml:sqltype kind="PREDEFINED" name="CHAR" maxlength="254"/>
335        </xsd:appinfo>
336      </xsd:annotation>
337      <xsd:restriction base="xsd:string">
338        <xsd:maxLength value="254"/>
339      </xsd:restriction>
```

```
451   <MRLocalElement>
452   <MRCWFInclusionRep_MRInclusionRep
453     lengthReference="/complexType1;XSDComplexTypeDefinition/XSDParticle/XSDModelGroup/
        XSDParticle/simpleInt;XSDElementDeclaration/"
454                   messageSetDefaultRep="CWF1" repeatCount="1">
455     <MRCWFSimpleRep_MRCWFBaseRep>
456       <MRCWFStringRep_MRCWFSimpleTD encodingNull="NullLogicalValue" encodingNullValue=""
        lengthEncoding="fixedLength"
457         lengthUnits="Bytes" paddingCharacter="NUL" stringJustification="leftJustify"/>
458     </MRCWFSimpleRep_MRCWFBaseRep>
459   </MRCWFInclusionRep_MRInclusionRep>
460   </MRLocalElement>
```

FIG. 4B     ↙ 450 mxsd file

```
471   <?xml version="1.0" encoding="UTF-8"?>
472   <xsd:schema xmlns:xsd="http://www.w3.org/2001/XMLSchema">
473     <xsd:include schemaLocation="wmqi21_datetime.mxsd"/>
474     <xsd:annotation>
475       <xsd:appinfo source="WMQI_APPINFO">
476         <MRMsgCollection name="new2.msd"/>
477       </xsd:appinfo>
478     </xsd:annotation>
479     <xsd:complexType name="complexType1">
480       <xsd:sequence/>
481     </xsd:complexType>
482     <xsd:element name="message1" type="complexType1">
483       <xsd:annotation>
484         <xsd:appinfo source="WMQI_APPINFO">
485           <xmlElemRep messageSetDefaultRep="XML" xmlName="message1XML"/>
486           <tdsElemRep messageSetDefaultRep="TDS" precision="-1" tag="theTag"/>
487   tag="theTag"/>
```

SINGLE FILE SERIALIZATION FOR PHYSICAL AND LOGICAL META-MODEL INFORMATION

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

When a meta-model is created, it may get "serialized" in two separate but interdependent files that store the logical meta-model and the physical meta-model, respectively. (As known to those skilled in the art, "serialization" in the present context is a process whereby the meta-model is flattened or collapsed for storage, to be regenerated into memory at a later time.) However, it may be difficult to compare two such serialized meta-models if there are both logical meta-model files and physical meta-model files to consider at the same time. Additionally, with such serialization, versioning a meta-model may also be more complex.

Thus, an improved technique for serializing logical and physical meta-model information for a meta-model would be desirable.

SUMMARY OF THE INVENTION

The present invention provides a technique for serializing both logical and physical meta-model information for a meta-model in a single file.

In an embodiment, logical meta-model information is serialized in an Extensible Markup Language (XML) schema compliant format, and physical meta-model information is inserted into the serialized logical meta-model in suitable locations such that mappings between the logical and physical meta-models are preserved for subsequent regeneration.

In an embodiment, an XML "appInfo" annotation (an XML extension mechanism that allows schema developers to include information specific to a particular application) is adapted and used to identify physical meta-model information usable by multiple platforms, applications, and wire formats.

In an aspect of the invention, there is provided a method of serializing a meta-model, said meta-model comprising logical meta-model information, physical meta-model information and mappings therebetween, said method comprising:
  converting said logical meta-model information into an XML schema compliant format suitable for storing said logical meta-model information in a file;
  inserting into said file said physical meta-model information utilizing at least one annotation configured to identify said physical meta-model information.

In an embodiment, each said insertion is made at a suitable location in said file to implicitly preserve said mappings between said logical and physical meta-models.

In an embodiment, said at least one annotation is an XML appInfo annotation, and said annotation identifying said physical meta-model information is suitably placed in a nested configuration relative to its corresponding logical meta-model information in said file.

In an embodiment, said converting said logical meta-model information into an XML schema compliant format comprises converting:
  (i) a name of a target class into a name of an element;
  (ii) an attribute of a target class into an attribute of an element, said attribute of said target class being serialized only if said attribute is set;
  (iii) an aggregation relationship into a nested element; and
  (iv) an association relationship into an attribute.

In an embodiment, inherited attributes from parent types are included.

In an embodiment, the name of said target class becomes the name of said nested element.

In an embodiment, if a relationship is named, then said name of said nested element includes the name of said target class, followed by the name of a corresponding instantiated class, followed by the name of said relationship.

In an embodiment, said association name becomes the name of said attribute, and the value of said attribute becomes a path of a target object.

In an embodiment, said method further comprises configuring said XML appInfo annotation to store physical meta-model information for more than one application.

In another aspect of the invention, there is provided a computer readable medium containing computer executable code for serializing a meta-model, said meta-model comprising logical meta-model information, physical meta-model information and mappings therebetween, said computer executable code comprising:
  code for converting said logical meta-model information into an XML schema compliant format suitable for storing said logical meta-model information in a file;
  code for inserting into said file said physical meta-model information utilizing at least one annotation configured to identify said physical meta-model information.

In an embodiment, said computer executable code further comprises code for inserting said physical meta-model information at suitable locations in said file to implicitly preserve said mappings between said logical and physical meta-models.

In an embodiment, said at least one annotation is an XML appInfo annotation, and said computer executable code further comprises code for identifying said physical meta-model information by suitably placing said at least one annotation in a nested configuration relative to its corresponding logical meta-model information in said file.

In an embodiment, said code for converting said logical meta-model information into an XML schema compliant format comprises code for converting:
  (a) a name of a target class into a name of an element;
  (b) an attribute of a target class into an attribute of an element, said attribute of said target class being serialized only if said attribute is set;
  (c) an aggregation relationship into a nested element; and
  (d) an association relationship into an attribute.

In an embodiment, said code is configured to include inherited attributes from parent types.

In an embodiment, said code is configured to assign the name of said target class to the name of said nested element.

In an embodiment, if a relationship is named, then said code is configured to include in said name of said nested element the name of said target class, followed by the name of a corresponding instantiated class, followed by the name of said relationship.

In an embodiment, said code is configured to assign the name of said association to the name of said attribute, and the value of said attribute to a path of a target object.

In an embodiment, said code is configured to store in said XML appInfo annotation physical meta-model information for more than one application.

In another aspect of the invention, there is provided a system comprising a processor and computer readable memory, said memory storing code for serializing a meta-model, said meta-model comprising logical meta-model information, physical meta-model information and mappings therebetween, said code being adapted to:

convert said logical meta-model information into an XML schema compliant format suitable for storing said logical meta-model information in a file;

insert into said file said physical meta-model information utilizing at least one annotation configured to identify said physical meta-model information.

In an embodiment, each said insertion is made at a suitable location in said file to implicitly preserve said mappings between said logical and physical meta-models.

In an embodiment, said at least one annotation is an XML appInfo annotation, and said code is adapted to place said annotation identifying said physical meta-model information in a nested configuration relative to its corresponding logical meta-model information in said file.

In an embodiment, said code is further adapted to store physical meta-model information for more than one application in said XML appInfo annotation.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention:

FIG. 3A is an illustrative example of logical meta-model information in a first file.

FIG. 3B is an illustrative example of physical meta-model information in a second file.

FIG. 3C is an illustrative example of an XML "appInfo" annotation defining one piece of application specific information.

DETAILED DESCRIPTION OF EXEMPLARY EMBODIMENTS

Figure 1:
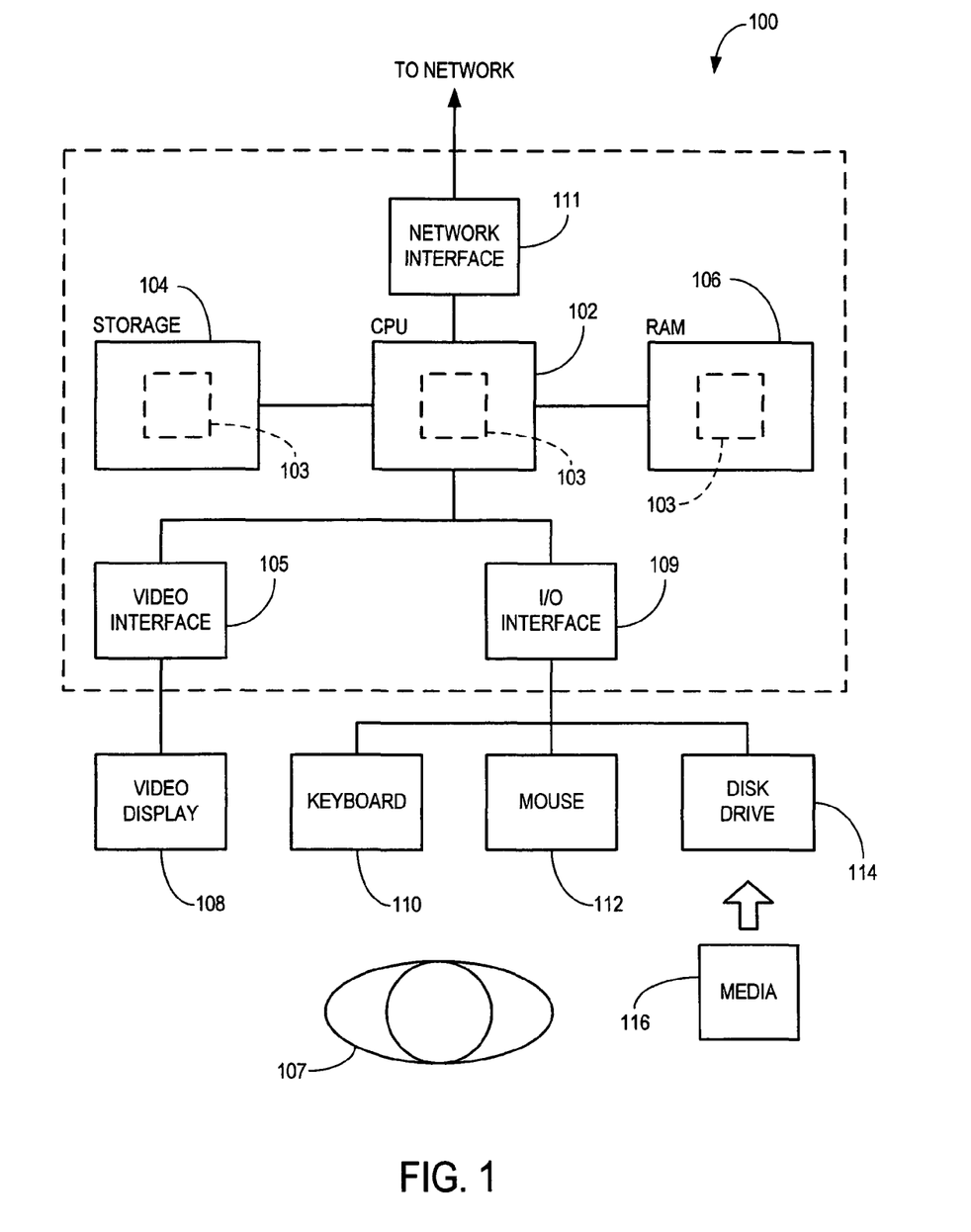
FIG. 1 is a schematic block diagram of a generic computer system which may provide an operating environment for exemplary embodiments of the invention.

Referring to FIG. 1, shown is an exemplary computer system 100 that may provide an operating environment for exemplary embodiments of the invention. The computer system 100 may include a central processing unit ("CPU") 102 connected to a storage unit 104 and to a random access memory ("RAM") 106. The CPU 102 may execute a software program 103 which may be stored in the storage unit 104 and loaded into RAM 106 as required. A user 107 may interact with the computer system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the computer system 100 may be network enabled via a network interface 111. It will be appreciated that the computer system 100 of FIG. 1 is merely illustrative and is not meant to be limiting in terms of the type of system that may provide a suitable operating environment for the invention.

As will be appreciated by those skilled in the art, in order to fully define a model (or, as commonly referred to in the art, a "meta-model"), both logical and physical information may be required. For the purposes of illustration consider, for example, a messaging meta-model for the transmission of messages between enterprises having disparate platforms, applications, and wire formats. In this example, a logical meta-model may define the logical structure of the message, while a physical meta-model may define various alternative wire formats of the message. The corresponding meta-model may thus provide an end-user with a view of the physical and logical information that pertains to a specific message that is being passed between the enterprises. One example of how such a meta-model may be formed is described in U.S. Pat. No. 7,559,052, the contents of which are hereby incorporated by reference.

In an embodiment, a user (e.g. user 107) may be permitted to modify the meta-model by editing the corresponding logical and physical meta-model information contained in serialized files. The user may use various I/O devices (e.g. video display 108, keyboard 110, and mouse 112) for this purpose. In addition, the user may be permitted to retrieve physical information from the serialized file that is available for any given logical construct. To make this possible, the meta-model maintains a set of mappings that dictate how the physical meta-model information links to the logical meta-model information.

A possible process for serializing a meta-model 200 and subsequently regenerating it that does not use the teaching of this invention is shown schematically in FIG. 2A and FIG. 2B, respectively. More specifically, in FIG. 2A, a meta-model 200 residing in memory (e.g. in RAM 106 of FIG. 1) includes a physical meta-model 202, a logical meta-model 204, and mappings 206 between the physical and logical meta-models 202, 204.

Using a suitable modeling and code generation tool, the logical and physical meta-models 202, 204 may be serialized into files 208, 210 which may be stored (e.g. in storage 104 of FIG. 1). One such tool is the Eclipse Modeling Framework ("EMF") which is a Java/XML framework for generating tools and other applications based on simple class models. An EMF code generator can be used to turn models into customizable Java code. For more detailed information, the reader is directed to the following URL:http://www.eclipse.org/emf/.

Figure 2A:
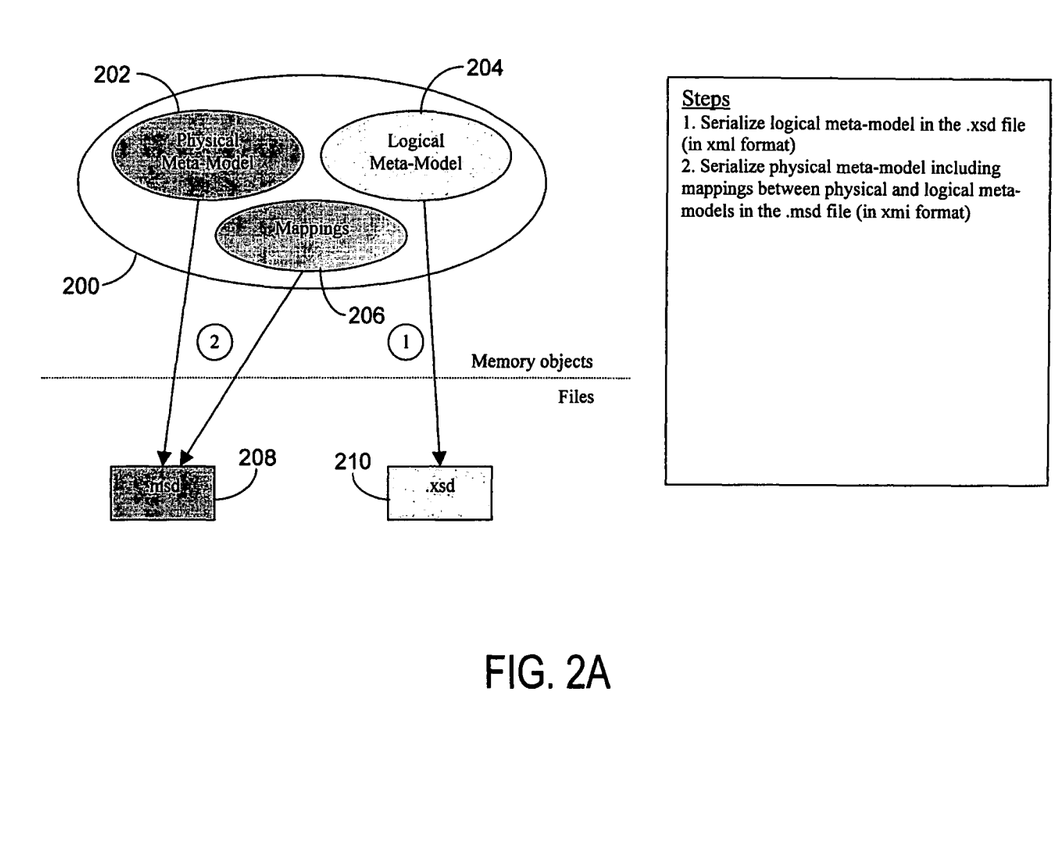
FIG. 2A is a schematic block diagram illustrating a process for serializing logical and physical meta-models in separate files.
Figure 2B:
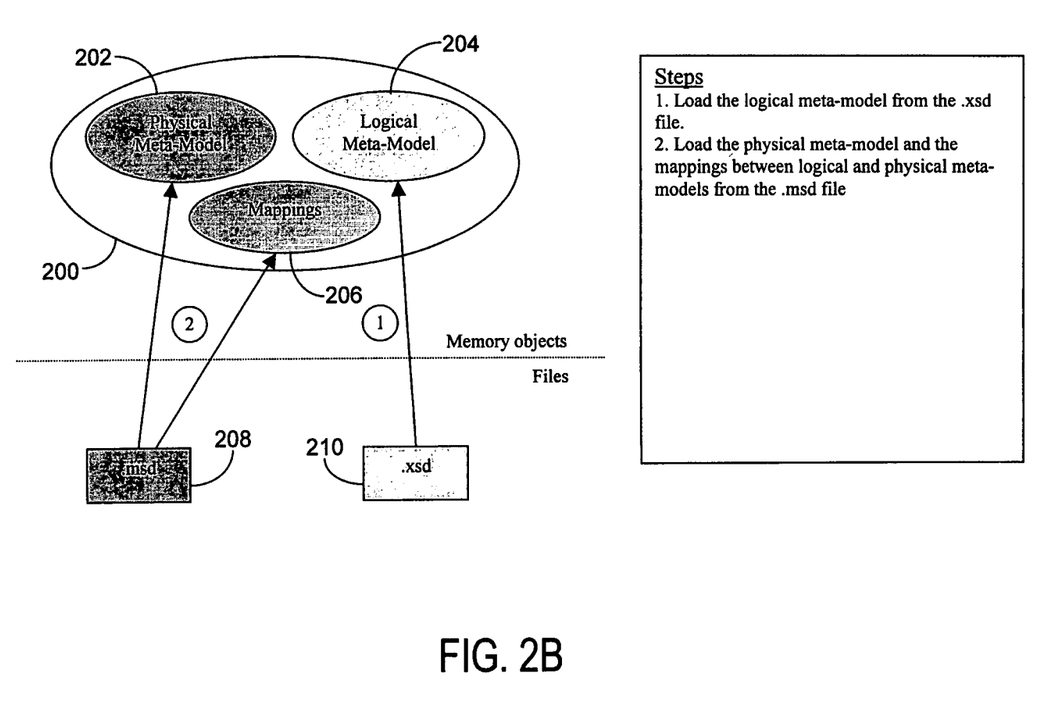
FIG. 2B is a schematic block diagram illustrating a process for regenerating logical and physical meta-model information from separate files.

For example, as shown in FIG. 2A, EMF may be used to serialize the meta-model 200 into two files: (1) an ".xsd" file 210 which is an XML schema file serializing the logical meta-model 204, and (2) an ".msd" file 208 which is an XML Metadata Interchange ("XMI") file serializing the physical meta-model 202 and the mappings 206 between physical meta-model 202 and logical meta-model 204. A corresponding process for regenerating the meta-model 200 from the .xsd file 210 and the .msd file 208 is shown in FIG. 2B.

For the purposes of illustration, consider FIG. 3A and FIG. 3B in which an illustrative .xsd file 300 and an illustrative .msd file 310 for a "messaging" meta-model are shown. (As previously noted, the "messaging" meta-model may relate to, for example, messaging between enterprises having disparate platforms, applications, and wire formats.)

As shown in FIG. 3A, illustrative .xsd file 300 contains declarations of a complex type called "complexType1" (line 303) and an element called "message1" (line 306). Looking at the corresponding .msd file 310 in FIG. 3B, it is apparent that there are at least two mappings from the physical meta-model to the logical meta-model, namely: (1) "MRGlobalElement_1→message1" (lines 314-315), and (2) "MRComplexType_1→complexType1" (lines 321-322).

The first of these mappings contains physical meta-model information pertaining to an XML and a tag delimited string ("TDS") representation of the element. (As known in the art, TDS is a common format for wire transfer.) That is, the XML representation provides the XML name "message1XML" (line 316) for the element with logical name "message1" (line 314). The TDS representation provides a tag="theTag" (line 317) for the element with logical name "message1" (line 314). In the present illustrative example, the second of these mappings does not contain any physical meta-model information.

As apparent from FIG. 3A and FIG. 3B, the EMF generated format of the .xsd file 300 and the corresponding .msd file 310 may be difficult to interpret by visual inspection. Moreover, comparing the files 300, 310 to other such files pertaining to similar messaging meta-models may be difficult.

As will now be described, in accordance with an embodiment of the present invention, a single file may be used to serialize both the logical and the physical meta-model information for a meta-model to improve readability, and therefore usability, of the meta-model.

In an embodiment of the invention, a logical meta-model is serialized in an XML schema compliant file which is annotated to include physical meta-model information and mappings. For example, the XML schema specification may provide support for two types of annotations: (1) documentation information; and (2) application specific information. It will be appreciated that it is possible for a user to create both annotation types at various levels of granularity throughout the XML schema file.

As previously mentioned, the XML appInfo annotation is an extension mechanism that allows schema developers to include information specific to a particular application. Consider the example in FIG. 3C where an IBM DB2™ database uses an appInfo annotation (i.e. at lines 332, 333 and 335) to define a piece of application specific information, namely, a new simple type with the name "CHAR" (line 334). When this schema is loaded by the DB2 application, the appInfo annotation contents are used to guide the DB2 application in selecting the proper native type.

As will become apparent, in accordance with one embodiment of the present invention, the appInfo annotation may be adapted from its original purpose of simply storing one piece of application specific information for one application, to store physical meta-model information for multiple applications. Advantageously, the resulting annotated XML schema contains information at a higher abstraction level that can be used by multiple applications running on various platforms and operating systems, and using different message formats.

In order to serialize both logical and physical meta-models into a single file, the following two issues need to be addressed:
  i) The physical meta-model should be serialized in a format that is easy to read and process;
  ii) The mappings between physical and logical meta-models must be preserved.

With respect to the first issue, the physical meta-model may be implemented, for example, using EMF. As known to those skilled in the art, the default behavior of EMF is to serialize the contents of a model using XMI. An example of such a file is the .msd file shown in FIG. 3B, referred to above.

With respect to the second issue, every construct in the physical meta-model should be mapped to one and only one construct in the logical meta-model. As will become apparent, in accordance with the teachings of the present invention, the mappings need not be explicitly stored in a schema file. Instead, the XML appInfo annotation of the corresponding logical element may be used to store the physical information. As a result, the mappings between the physical and logical meta-models become implicit rather than explicit.

In accordance with an embodiment of the invention, an EMF reflection application programming interface (API) is used to analyze the physical meta-model 202 (FIG. 2A), discover the physical attributes that are set, and analyze all the references in order to extract all the physical information.

In accordance with an embodiment of the invention, the conversion process from an EMF model to XML constructs may be defined as follows, using unified modeling language or ("UML") terminology:
  (i) The name of a class will become the name of the element.
  (ii) The attributes of a class will become attributes of the element. They will only be serialized if they are set. The inherited attributes from parent types will also be included.
  (iii) An aggregation relationship will result in a nested element. The name of the nested element will become the name of the actual target class, followed by the name of a corresponding instantiated class (i.e. the name of a corresponding class object created in memory), followed by the name of the relationship. If the relationship is not named then the class name of the target class will be used.
  (iv) An association relationship will result in a XML attribute which has as a name the association name and as a value the path of the target object.

In order to limit complexity, the following schema elements are not supported by the above conversion process:
  Multi valued attribute.
  0 . . . n association relationship (but aggregation relationships with a multiplicity of 0 . . . n, and a 1-1 association relationship, are supported).
  Attribute in a class that has the same name with an attribute in a parent class.
  Association with role name that is the same with an attribute name in the source class.
  Association with target class name (and no role name) that is the same with an attribute name in the source class.

EXAMPLE

Figure 4A:
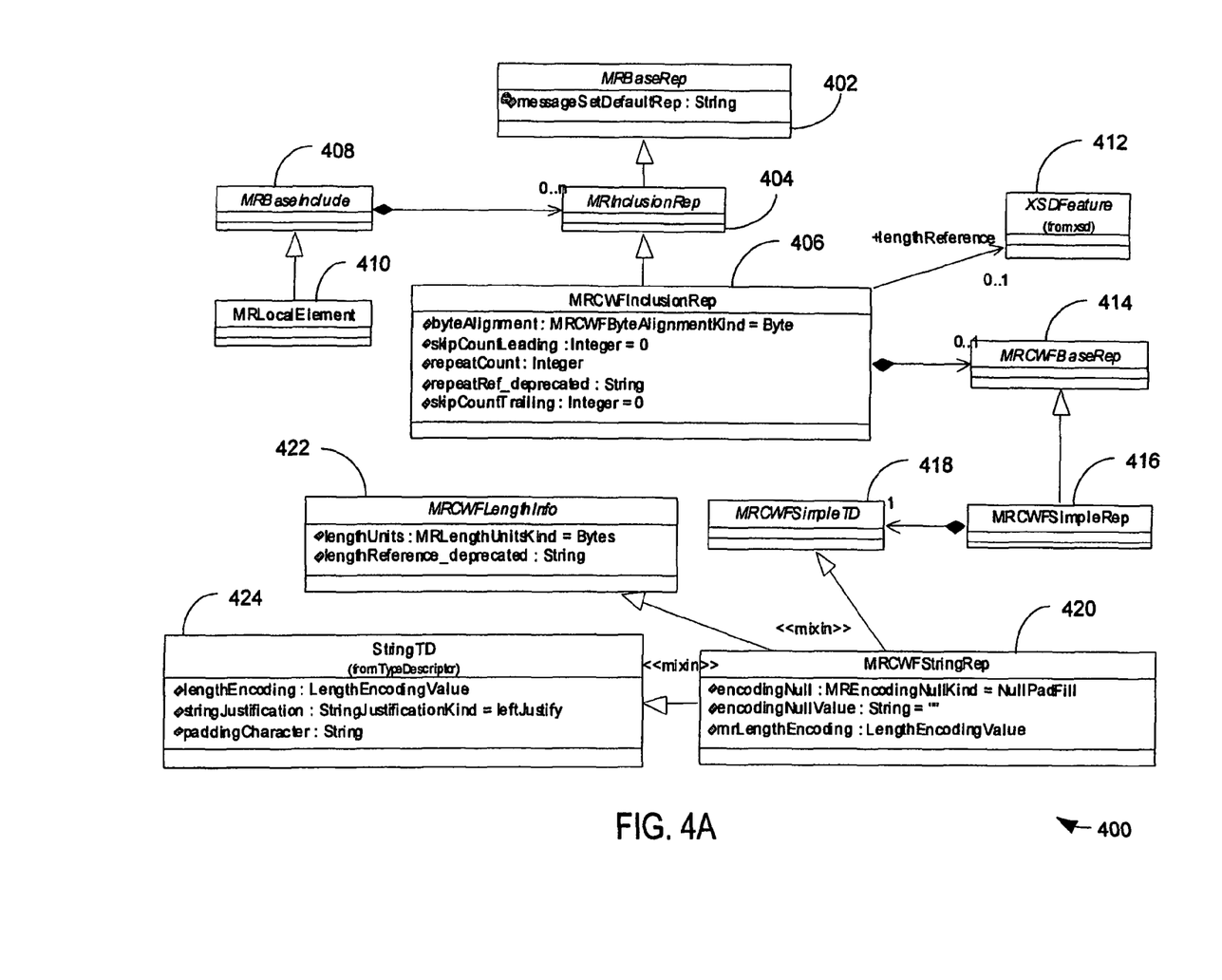
FIG. 4A is a schematic block diagram of an illustrative messaging meta-model.

By way of example, the conversion process defined above may be used to serialize an illustrative messaging meta-model 400, (shown in UML) in FIG. 4A. As will be apparent from FIG. 4A, a class 402 ("MRBaseRep") has an "association" relationship with class 404 ("MRInclusionRep"), which in turn has an "association" relationship with class 406 ("MRCWFInclusionRep"). Class 408 ("MRBaseInclude") has an "aggregation" relationship with class 404, for a multiplicity of 0 . . . n. That is to say, there are 0 . . . n instances of class 404 in an "aggregation" relationship with class 408. Class 408 also has an "association" relationship with class 410 ("MRLocalElement").

Referring back to class 406, it is also apparent that class 406 has an "association" relationship with 0, or one, of class 412 ("XSDFeature"). In turn, class 406 has an "aggregation" relationship with class 414 ("MRCWBaseRep") with a multiplicity of 0 . . . 1. Also, class 414 has an "association" relationship with class 416 ("MRCWFSimpleRep"), and class 416 has an "aggregation" relationship with class 418 ("MRCWFSimpleTD") with a multiplicity of 1. Class 418 also has an "association" relationship with class 420 ("MRCWFStringRep"). Class 420, in turn, has "association" relationships with each of class 422 ("MRCWFLengthInfo") and class 424 ("StringTD"). For the purposes of the present illustration, the classes, attributes and relationships shown in FIG. 4A collectively define, in part, an illustrative messaging meta-model 400.

Figure 4B:
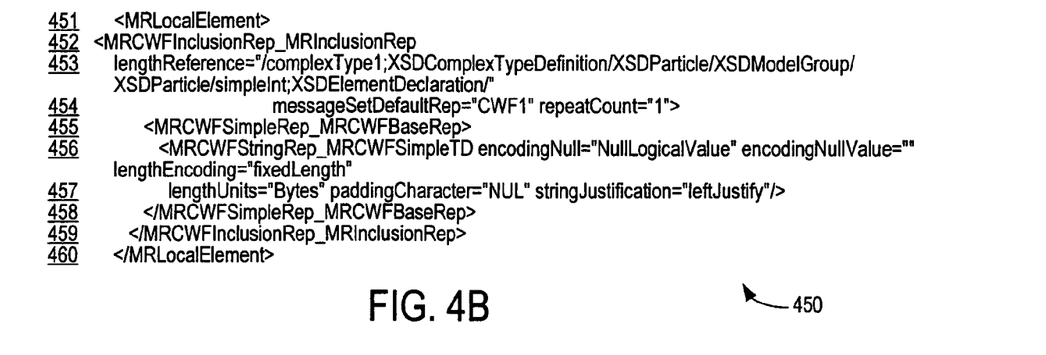
FIG. 4B is an illustrative example of logical meta-model information for the meta-model of FIG. 4A.

An EMF model 450 is first generated from the meta-model 400 using EMF, as shown in FIG. 4B. The EMF model is then converted to an XML schema compliant meta-model representation generated using the conversion process described above. The result of the conversion from EMF to XML is shown in the .mxsd file 470 of FIG. 4C. As will be readily apparent, the XML schema compliant .msxd file 470 is easier to read in comparison to the EMF meta-model representation in FIG. 4B.

Figure 4C:
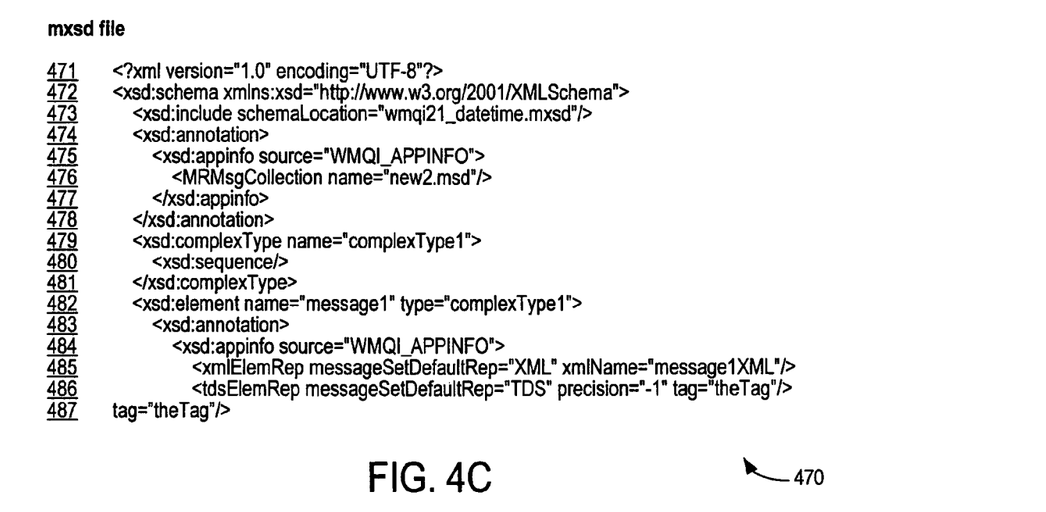
FIG. 4C is an illustrative example of physical meta-model information inserted in a logical meta-model utilizing XML "appInfo" annotations.

Still referring to FIG. 4C, it is apparent that a number of annotations have been placed in the .msxd file 470 in order to insert physical meta-model information, and to preserve mappings between the logical and physical meta-model information. For example, the element "message1" (line 482) now contains an appInfo annotation at lines 483-487. Also, "message1" contains two kinds of physical information: (1) an XML representation with xmlName="message1XML" (line 485), and (2) a TDS representation with a tag="theTag" (line 486). Furthermore, it will be apparent that placement of the appInfo annotation in a nested configuration at this particular location may provide an implicit mapping between the physical meta-model information and the corresponding logical meta-model information. Using the various appInfo annotations inserted at suitable locations in the .msxd file 470, the physical meta-model information, as well as the mappings between logical and physical meta-models, may be regenerated from the single .msxd file 470.

Figure 5A:
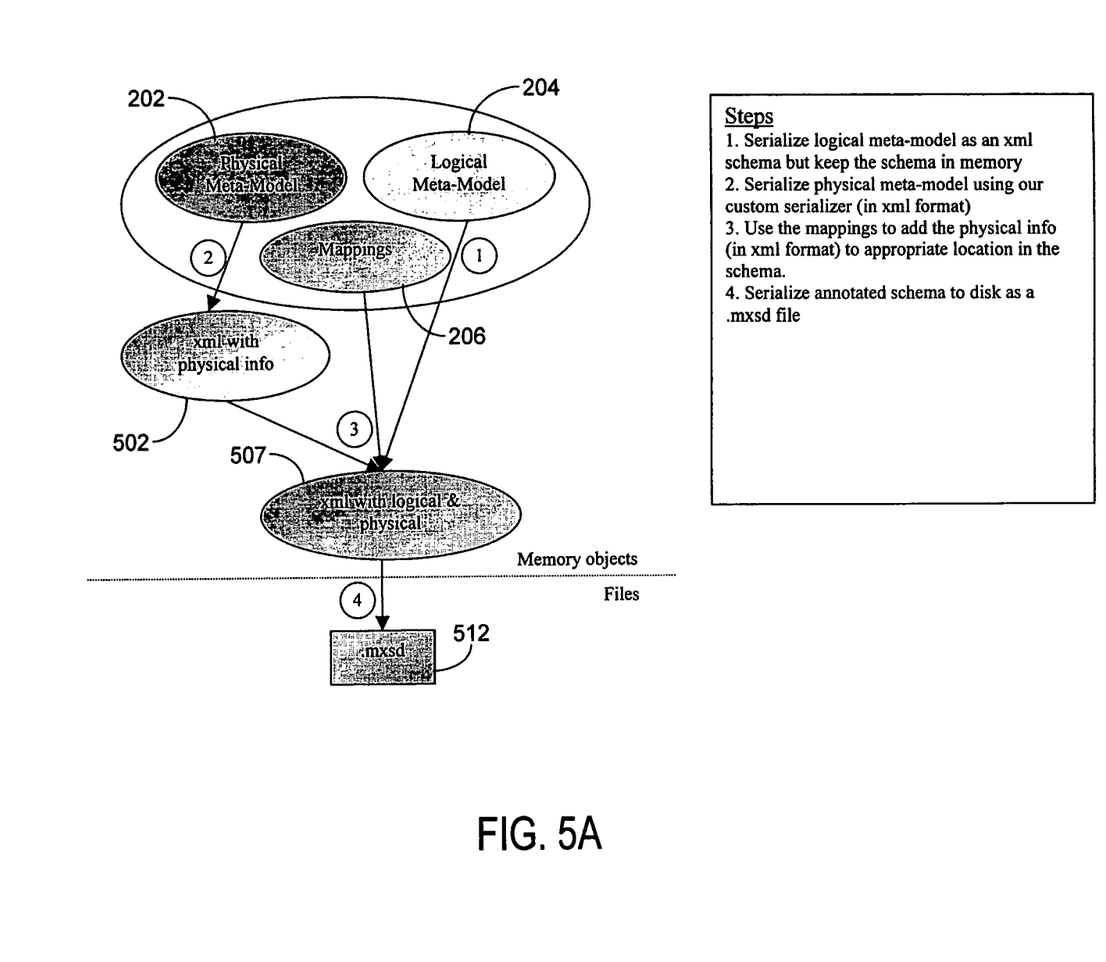
FIG. 5A is a schematic block diagram of a process for serializing logical and physical meta-model information in a single file, in accordance with an exemplary embodiment of the invention.

By way of example, a process of serializing the physical meta-model information and logical meta-model information in a single .mxsd file in accordance with an embodiment of the invention is shown schematically in FIG. 5A. A process for subsequently regenerating the information from the .mxsd file in accordance with an embodiment of the invention is shown in FIG. 5B.

More particularly, by comparing FIG. 5A to FIG. 2A, it is apparent that a single .mxsd file 512 now replaces the two files, namely the .msd file 208 and the .xsd file 210, of FIG. 2A. Also, by comparing FIG. 5B to FIG. 2B, it is seen that regenerating the logical and physical meta-models from the single .mxsd file 512 now involves generating intermediate representations of: (1) XML with physical information 502; and (2) an intermediate representation of XML with logical and physical information 507.

Figure 5B:
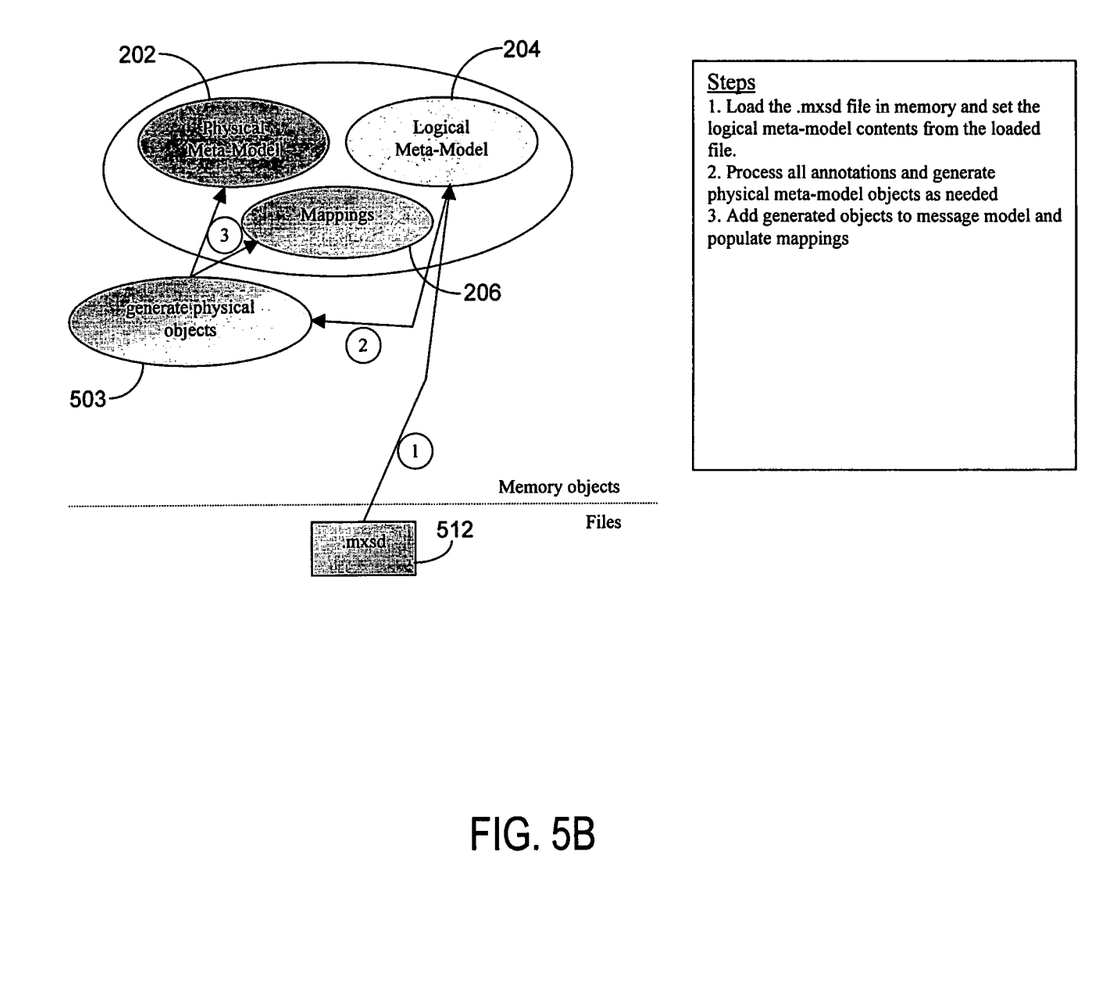
FIG. 5B is a schematic block diagram of a process for regenerating logical and physical meta-model information from a single file, in accordance with an exemplary embodiment of the invention.

Thus, as shown in FIG. 5B, the logical meta-model 204 may be regenerated from the .msxd file 512, and the annotations in the .msxd file 512 can be analyzed to generate physical meta-model objects as needed. In an embodiment, in order to extract the physical and meta-model information from the appInfo annotations, each appInfo annotation is processed using EMF to generate an appropriate physical meta-model object in 503. These physical meta-model objects may then be inserted into a newly created physical meta-model 202. As the physical meta-model objects are being inserted into the newly created physical meta-model 202, the mappings in 206 may also be generated to link the logical meta-model and the physical meta-model.

Advantageously, using the single .mxsd file to regenerate the logical and physical meta-models avoids any difficulties associated with out of synch logical and physical meta-models serialized in separate files. Furthermore, comparison between meta-models and versioning of meta-models may become significantly easier.

While exemplary embodiments of the invention have been shown and described, it will be appreciated that various changes and modifications may be made without departing from the scope of the invention as defined in the following claims.

What is claimed is:

1. A computer-implemented method of serializing a meta-model, said meta-model comprising logical meta-model information, physical meta-model information and mappings therebetween, said method comprising:
    serializing said logical meta-model information into an extensible markup language XML schema representation;
    preserving the mappings between the logical meta-model information and the physical meta-model information in the XML schema representation,
        wherein said preserving the mappings between the logical meta-model information and the physical meta-model information in the XML schema representation comprises creating an annotation in the XML schema representation for each of the mappings, wherein the annotation identifies a corresponding one of the set of one or more constructs of the physical meta-model information;
    serializing the physical meta-model information into an intermediate representation, wherein the intermediate representation indicates a set of one or more constructs of the physical meta-model information; and
    inserting into the XML schema representation each of the set of one or more constructs of said physical meta-model information from the intermediate representation in accordance with the mappings preserved in the XML schema representation.

2. The computer-implemented method of claim 1, wherein each annotation is an XML appInfo annotation, and is suitably placed in a nested configuration relative to its corresponding construct of the logical meta-model information in said XML schema representation.

3. The computer-implemented method of claim 1, wherein said serializing said logical meta-model information into the XML schema representation comprises converting:
    (i) a name of a target class into a name of an element;
    (ii) an attribute of a target class into an attribute of an element, said attribute of said target class being serialized only if said attribute is set;

(iii) an aggregation relationship into a nested element; and
(iv) an association relationship into an attribute.

4. The computer-implemented method of claim 3, wherein said converting an attribute of a target class into an attribute of an element comprises including inherited attributes from parent types.

5. The computer-implemented method of claim 3, wherein said converting an aggregation relationship into a nested elements comprises converting the name of said target class into a name of said nested element.

6. The computer-implemented method of claim 5, wherein if said aggregation relationship is named, then said name of said nested element includes the name of said target class, followed by a name of a corresponding instantiated class, followed by a name of said aggregation relationship.

7. The computer-implemented method of claim 3, wherein said converting an association relationship into an attribute comprises converting the name of said association relationship into the name of said attribute, and the value of said attribute into a path of a target object.

8. The computer-implemented method of claim 2, further comprising configuring at least one XML appInfo annotation to store physical meta-model information for more than one application.

9. A computer readable medium comprising a memory, wherein the memory stores computer executable code for serializing a meta-model, said meta-model comprising logical meta-model information, physical meta-model information and mappings therebetween, said computer executable code of said memory comprising:
    code for serializing said logical meta-model information into an extensible markup language XML schema representation;
    code for preserving the mappings between the logical meta-model information and the physical meta-model information in the XML schema representation, wherein said code for preserving the mappings between the logical meta-model information and the physical meta-model information in the XML schema representation comprises code for creating an annotation in the XML schema representation for each of the mappings, wherein the annotation identifies a corresponding one of the set of one or more constructs of the physical meta-model information;
    code for serializing the physical meta-model information into an intermediate representation, wherein the intermediate representation indicates a set of one or more constructs of the physical meta-model information; and
    code for inserting into the XML schema representation each of the set of one or more constructs of said physical meta-model information from the intermediate representation in accordance with the mappings preserved in the XML schema representation.

10. The computer readable medium of claim 9, wherein each annotation is an XML appInfo annotation, and said computer executable code further comprises code for suitably placing each annotation in a nested configuration relative to its corresponding construct of the logical meta-model information in said XML schema representation.

11. The computer readable medium of claim 9, wherein said code for serializing said logical meta-model information into an XML schema representation comprises code for converting:
    (a) a name of a target class into a name of an element;
    (b) an attribute of a target class into an attribute of an element, said attribute of said target class being serialized only if said attribute is set;
    (c) an aggregation relationship into a nested element; and
    (d) an association relationship into an attribute.

12. The computer readable medium of claim 11, wherein said code for converting an attribute of a target class into an attribute of an element is configured to include inherited attributes from parent types.

13. The computer readable medium of claim 11, wherein said code for converting an aggregation relationship into a nested elements is configured to assign the name of said target class to a name of said nested element.

14. The computer readable medium of claim 13, wherein if said aggregation relationship is named, then said code is configured to include in said name of said nested element the name of said target class, followed by a name of a corresponding instantiated class, followed by the name of said aggregation relationship.

15. The computer readable medium of claim 11, wherein said code for converting an association relationship into an attribute is configured to assign the name of said association relationship to the name of said attribute, and the value of said attribute to a path of a target object.

16. The computer readable medium of claim 10, wherein said code is configured to store in at least one XML appInfo annotation physical meta-model information for more than one application.

17. A system comprising a processor and computer readable memory, said memory containing code for serializing a meta-model, said meta-model comprising logical meta-model information, physical meta-model information and mappings therebetween, said code executable by the processor to cause the system to:
    serialize said logical meta-model information into an extensible markup language XML schema representation;
    preserve the mappings between the logical meta-model information and the physical meta-model information in the XML schema representation,
        wherein the code executable to cause the system to preserve the mappings between the logical meta-model information and the physical meta-model information in the XML schema representation comprises code executable to cause the system to create an annotation in the XML schema representation for each of the mappings, wherein the annotation identifies a corresponding one of the set of one or more constructs of the physical meta-model information;
    serialize the physical meta-model information into an intermediate representation, wherein the intermediate representation indicates a set of one or more constructs of the physical meta-model information; and
    insert into the XML schema representation each of the set of one or more constructs of said physical meta-model information from the intermediate representation in accordance with the mappings preserved in the XML schema representation.

18. The system of claim 17, wherein each annotation is an XML appInfo annotation, and said code is executable to cause the system to place said annotation in a nested configuration relative to its corresponding construct of the logical meta-model information in XML schema representation.

19. The system of claim 17, wherein said code is further executable to cause the system to store physical meta-model information for more than one application in said XML appInfo annotation.

* * * * *